United States Patent [19]

Minatono et al.

[11] 3,898,193

[45] Aug. 5, 1975

[54] PRODUCING MALEINIZED POLYISOPRENE OF HIGH GREEN STRENGTH

[75] Inventors: Shobu Minatono; Takayuki Okamura; Junnosuke Yamauchi; Kazuhisa Yamauchi, all of Ibaragi, Japan

[73] Assignee: Kuraray Co., Ltd., Kurashiki, Japan

[22] Filed: Nov. 26, 1973

[21] Appl. No.: 418,989

[30] Foreign Application Priority Data
Dec. 2, 1972 Japan............................ 47-120962

[52] U.S. Cl. ...... 260/42.47; 260/42.32; 260/78.4 D; 260/94.7 A
[51] Int. Cl. ........................ C08c 11/06; C08f 3/48
[58] Field of Search....... 260/78.4 D, 94.7 A, 42.32, 260/42.47, 42, 42.29

[56] References Cited
UNITED STATES PATENTS
2,649,439   8/1953   Brown............................ 260/42.52

2,710,292   6/1955   Brown................................ 260/83.5
2,724,707   11/1955  Brown................................ 260/82.1
3,644,248   2/1972   Luijk et al...................... 260/23.7 M

OTHER PUBLICATIONS

Brown et al., Ind. Eng. Chem. 47, 1006–1012, (1955), TP1A58.

Primary Examiner—Donald E. Czaja
Assistant Examiner—H. H. Fletcher
Attorney, Agent, or Firm—Bacon & Thomas

[57] ABSTRACT

An unvulcanized maleinized polyisoprene rubber composition which contains, as one of the compounding ingredients, a compound of a metal of Groups II and IV of the Periodic Table and which is used for the preparation of a vulcanized shaped article, is produced by mixing said rubber and the metal compound at a temperature above 80°C, whereby the resulting rubber composition has a very high green strength.

9 Claims, 1 Drawing Figure

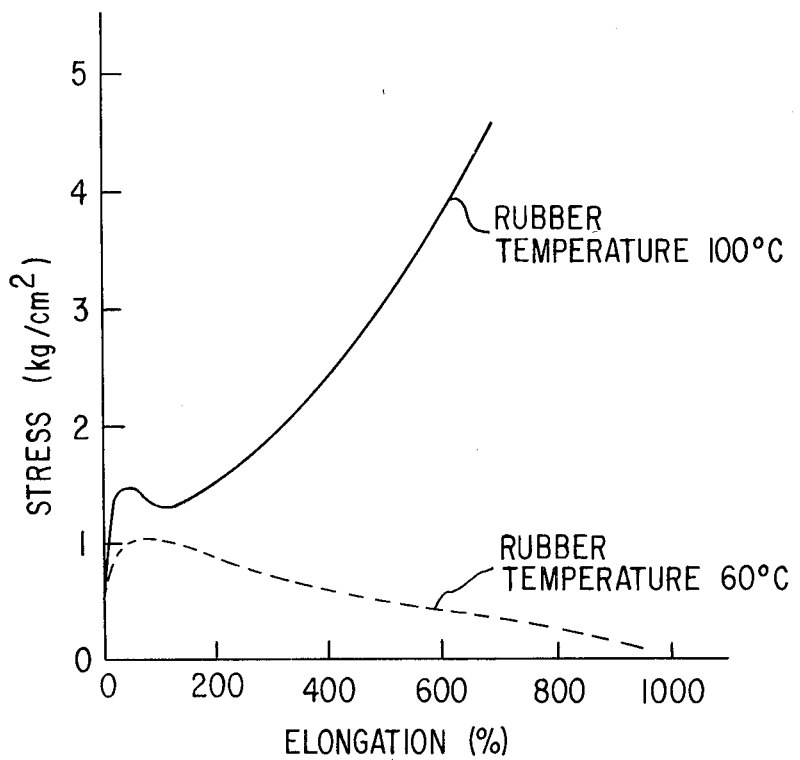

ically high green strength can be obtained with good reproducibility according to the invention.

PRODUCING MALEINIZED POLYISOPRENE OF HIGH GREEN STRENGTH

BACKGROUND OF THE INVENTION

1. Field of the Invention

This invention relates to a process for producing an unvulcanized rubber composition having improved mechanical properties, and more particularly, to a process for producing an unvulcanized rubber composition comprising maleinized synthetic cis-1,4-polyisoprene having improved properties.

2. Description of the Prior Art

Synthetic cis-1,4-polyisoprene rubber (hereinafter referred to as "IR") can be used as a rubber material for general purposes and it has excellent physical properties similar to those of natural rubber. However, IR has one serious shortcoming in that it has rather poor mechanical properties in the unvulcanized state (so-called "green strength"). As one method for improving the green strength, it has been proposed to react maleic anhydride and/or a maleic anhydride derivative (hereinafter referred to as "MAn") with IR, namely maleinization (e.g., U.S. Pat. No. 3,567,691, British Pat. Specification Nos. 1,204,729 and 1,141,558).

When an unvulcanized rubber composition to be used for the preparation of vulcanized articles is produced by using, as a rubber material, IR having bound MAn in the polymer, namely maleinized IR (hereinafter referred to as "MAn-IR"), a conventional compounding prescription for natural rubber or ordinary IR is employed, wherein the compounding ingredients used always contain a compound of a metal of Groups II or IV of the Periodic Table such as zinc oxide. The unvulcanized MAn-IR composition obtained by using such compounding ingredients does not exhibit a uniformly improved green strength and, in addition, often does not exhibit a sufficiently high green strength as is practically required. Although the green strength can be elevated by increasing the amount of MAn to be reacted with IR, MAn-IR having an excessive content of MAn (e.g., MAn-IR having a bound MAn content of more than 2.5 moles per 100 recurring units of isoprene monomer in the polymer) shows reduced processability (e.g., workability on roll, mill shrinkage, extrudability, fillerdispersibility) and the physical properties of the obtained vulcanizate are deteriorated.

SUMMARY OF THE INVENTION

Accordingly, there is a need for such unvulcanized compositions having practically high green strength which can be produced with good reproducibility by mixing MAn-IR having a limited content of bound MAn with compounding ingredients containing a compound of a metal of Groups II or IV of the Periodic Table.

The primary object of the present invention is to provide a process which fulfills this need.

According to the present invention, unvulcanized compositions having increased green strength can be prepared by mixing MAn-IR having a bound MAn content of 0.03 to 2.5 moles (per 100 recurring units of isoprene monomer) with compounding ingredients containing the above metal compound at a temperature above 80°C.

Surprisingly, it has been found that the unvulcanized compositions produced by mixing MAn-IR with a compound of a metal belonging to Groups II and IV of the Periodic Table show broadly different green strength without reproducibility depending upon the mixing process, especially mixing temperature, even though MAn-IR having the same bound MAn content is used and the same compounding prescription is employed. According to the present invention, the green strength reaches saturation by mixing MAn-IR and the above metal compound at a temperature above 80°C, preferably at least 90°C, resulting in the disappearance of the temperature dependency of the green strength.

It should be noted that the above-mentioned effect of this invention can be obtained only by controlling the mixing temperature as far as the bound MAn content in the MAn-IR in combination with the compounding ingredients falls within the above range. The term "mixing temperature" as used herein indicates the temperature of the rubber at the completion of mixing or just before or just after the completion of the mixing. Therefore, as long as the temperature of the rubber at or about the completion of mixing is above 80°C, the initial temperature may be below 80°C. The period of time the rubber is kept at above 80°C may not be limited but it is preferably at least 1 minute, more preferably 2 to 30 minutes. In the present invention, the mixing is more preferably carried out at a temperature of at least 90°C whereby higher and more uniform green strengths can be obtained. The upper limit of the rubber temperature should be below 230°C, particularly below 200°C, which is restricted mainly from the point of view of thermal degradation of the rubber molecule and the working.

BRIEF DESCRIPTION OF THE DRAWING

The FIGURE shows the stress-strain relationships for an unvulcanized rubber composition at different temperatures.

DESCRIPTION OF THE PREFERRED EMBODIMENTS

The following experiment shows illustratively that the green strength of the unvulcanized composition is varied according to the mixing temperature even when using MAn-IR having the same bound MAn content, and that compositions having highly improved green strength can be obtained with good reproducibility according to the invention.

The maleinization reaction was effected by adding benzoyl peroxide and maleic anhydride to a xylene solution of IR having a cis-1,4 content of 98% and an intrinsic viscosity $[\nu]$ of 3.8 dl/g measured at 30°C in toluene. The bound MAn content in the resulting MAn-IR was 0.09 mole per 100 recurring units of isoprene monomer. Said MAn-IR was mixed with the compounding ingredients according to the prescription in Table 1 by mill mixing.

Table 1

| | |
|---|---|
| Rubber polymer | 100 parts |
| HAF carbon black | 45 parts |
| Zinc oxide | 5 parts |
| Stearic acid | 3 parts |
| Sulfur | 1.5 parts |
| Accelerator MSA[1] | 0.8 part |
| Antioxidant NS-6[2] | 1 part |

Note: [1]N-Oxydiethylene-2-benzothiazole sulfenamide
[2]2,2'-Methylene bis(4-methyl-6-tert-butylphenol)

The mill was set at a prescribed temperature. The rubber polymer was banded on the roll and masticated to give a smooth surface. Then HAF carbon black and stearic acid were added to the rubber followed by the addition of zinc oxide. Thereafter, antioxidant NS-6 and sulfur were added, and lastly vulcanization accelerator MSA was added. The resulting mixture was still mixed for 5 minutes. After finishing the mixing, the temperature of the rubber was measured by inserting a thermocouple into the block rubber composition. The obtained unvulcanized rubber composition was sheeted (to a thickness of about 2 mm) by rolls, and the green strength of the composition was measured on this sheet. The results are shown in Table 2 below. The stress-strain curves of said unvulcanized composition obtained by mixing at rubber temperatures of 60°C and 100°C respectively are shown in the FIGURE.

Table 2

| Temperature of the unvulcanized rubber composition just after finishing the mixing (°C) | Green strength (kg/cm$^2$) | |
|---|---|---|
| | Yield stress | Stress at 400% elongation |
| 50 | 1.0 | 0.5 |
| 60 | 1.0 | 0.6 |
| 70 | 1.3 | 1.5 |
| 80 | 1.5 | 2.0 |
| 90 | 1.4 | 2.4 |
| 100 | 1.5 | 2.5 |
| Control IR (90°C) | 0.9 | 0.3 |

Note: Measured by the Instron tester at 25°C in a cross head speed of 2 cm/minute.

As is apparent from Table 2, the green strength increases remarkably when the mixing is conducted at a rubber temperature of above 70°C and saturates at a temperature of above 80°C, particularly 90°C or higher.

The compounds of a metal belonging to Groups II and IV of the Periodic Table to be used in the invention as one of the compounding ingredients are generally any of those compounds which are used for such purpose in these rubber compositions. The compounds include, for example, oxides such as magnesium oxide, calcium oxide, zinc oxide, cadmium oxide and lead oxide; hydroxides such as calcium hydroxide and cadmium hydroxide; carbonates such as magnesium carbonate and zinc carbonate; higher fatty acid salts such as zinc stearate, zinc oleate, lead stearate and lead oleate; acetates thereof; and oxalates thereof. The metal oxide may be used singly, but it can work more effectively to increase the green strength in combination with a higher fatty acid such as stearic acid. In view of keeping a balance among the green strength, the vulcanizing characteristics and the physical properties of the vulcanizates, the combination of zinc oxide and stearic acid which is generally used in the rubber industry is the most favorable. The compound of a metal belonging to Groups II and IV of the Periodic Table is usually used in an amount of 0.5 to 15 parts by weight, preferably 1 to 10 parts by weight, per 100 parts by weight of MAn-IR, although greater or lesser amounts can be used depending on the results desired.

The particular compound employed is not critical and those skilled in the art can select any compound of such metals depending on the results desired. Thus, the present invention broadly includes, without limitation, any compounds of such metals, although the oxides, hydroxides, carbonates, higher fatty acid salts, acetates and oxalates and mixtures thereof are preferred.

In addition to the said metal compound, vulcanizing agents (e.g. sulfur), vulcanizing accelerators and vulcanizing aids may also be included among the compounding ingredients in the unvulcanized rubber composition to be used for preparing vulcanized articles according to the invention. These other additives may be selected from known and conventional compounds. If required, fillers (e.g. carbon black, silica, clay, calcium carbonate), antioxidants, extender oil, and other kind of rubbers may be incorporated therein as is conventional. A roll mill, Banbury mixer, pressure kneader, or Brabender Plastograph can be used for mixing the MAn-IR with the compounding ingredients. The mixer used is not critical.

The reaction of IR with maleic anhydride to produce MAn-IR is known per se [e.g. U.S. Pat. No. 3,567,691, British Pat. Specification No. 1,204,729, and U.S. Pat. No. 2,662,874]. Generally, the MAn-IR employed in the present invention may be defined as cis-1,4-polyisoprene having bound maleic anhydride units contained in the polymer molecule. However, different derivatives thereof may be employed in the present invention.

The first type of MAn-IR is an adduct obtained by reacting IR with maleic anhydride. Such adducts are known and processes for producing the same are described in, for example, U.S. Pat. No. 2,662,874; British Pat. Specification No. 1,119,629; and British Pat. Specification No. 1,204,730. Those skilled in the art are aware of techniques for reacting maleic anhydride with IR to produce these adducts. If necessary, a free radical yielding catalyst or a solvent may be used in the reaction. For example, the reaction can be effected by adding maleic anhydride and a free radical yielding catalyst to a solution of IR, and heating the resulting homogeneous or heterogenous solution in an inert gas atmosphere. The reaction in the homogeneous solution system may be carried out in an aromatic hydrocarbon solvent (e.g., benzene, toluene, xylene, etc) or in an aliphatic hydrocarbon solvent (e.g., n-hexane, n-heptane, etc.), and the reaction in a heterogeneous solution system may be carried out by using as the solvent n-butane or isopentane or by using a mixture of a solvent and a precipitant. The reaction may also be effected in the absence of such free radical catalysts.

A second type of MAn-IR useful in the present invention is a product obtained by converting the bound maleic anhydride groups in the polymer into the free acid form, the metal salt form, the mono- or di-ester form, the amide form or the imide form, by reacting the adduct obtained in the first group described with, for example, alcohols such as methanol, ethanol or n-butanol or amines such as ammonia, n-butyl amine, iso-butyl amine, allyl amine, di-n-butyl amine, monoethanol amine, diethanol amine, triethyl amine, tri-isopropanol amine or pyridine, if necessary in the presence of a catalyst such as p-toluene sulfonic acid. Thus, the maleic anhydride group may converted into a maleic acid estter, such as the alkyl esters having from 1 to 8 carbon atoms. Likewise, the maleic anhydride group may be converted into the free acid form or the acid salt form (such as a metal salt) by hydrolyzing the acid anhydride group with either an acid or an alkali. Either one or both of the carboxylic groups of the maleic anhydride group may be converted into the corresponding ester, amide or imide, or the free acid or acid salt form. The conditions of reaction are not critical, and those conditions which are generally used for reacting an acid anhydride with the aforementioned materials to produce the above derivatives can be employed, with those skilled in the art being aware of such techniques.

A third form of the MAn-IR used in the present invention comprises adducts obtained by reacting a maleic anhydride derivative with IR, the maleic anhydride derivative including, for example, mono- or di-esters of maleic acid (such as the alkyl esters having from one to eight carbon atoms), maleic acid amides or maleic acid imides. This form of the MAn-IR can be produced by reacting the maleic acid esters, maleic acid amides, or maleimides with IR under suitable reaction conditions, such as those conditions discussed above in the reaction between IR and maleic anhydride per se. These maleic anhydride derivatives are per se known compounds, and the reaction product of these derivatives with IR can be prepared using known techniques.

A fourth type of the MAn-IR useful in the present invention is a polymer containing both maleic anhydride and one or more of the aforesaid maleic anhydride derivatives in the molecular chain thereof. These polymers may be produced by incompletely reacting an adduct of IR with maleic anhydride with, for example, an alcohol or an amine to incompletely convert the maleic anhydride group into, for example, an ester, an amide or an imide, or likewise the free acid form thereof or the acid salt form thereof.

A fifth type of the MAn-IR useful in the present invention comprises mixtures of the above four types, such as a mixture of the first adduct with any of the second, third or fourth types of material.

Therefore, the terminology MAn-IR includes all of the above types of materials, all being operable in the present invention.

It is desirable from the point of view of the processability of the resulting composition and the physical properties of the final product to use MAn-IR without a substantial increase in gel content in comparison with that of the starting IR. Reference is made to co-pending U.S. patent application Ser. No. 370,380, filed June 15, 1973 for methods of producing such MAn-IR. The disclosure of this application is hereby incorporated herein by reference.

The bound MAn content in the MAn-IR used in the invention should be in a range from 0.03 to 2.5 moles per 100 recurring units of isoprene monomer in the polymer. The bound MAn content can be measured by dissolving the MAn-IR in benzene and conducting a titration with a solution of sodium hydroxide in a mixed solvent of methanol and benzene. The desired effect cannot be attained when the bound MAn content is less than 0.03 mole per 100 recurring units of isoprene monomer. On the other hand, MAn-IR having a bound MAn content of above 2.5 moles exhibits a markedly lowered processability and other physical properties, and it provides an unvulcanized composition which is unsuitable for preparing vulcanized articles by mixing at a temperature of above 80°C. It is more preferable to use MAn-IR having a bound MAn content of 0.05 to 1.2 moles per 100 recurring units of isoprene monomer in the polymer, whereby the unvulcanized composition having a green strength almost the same as that of natural rubber, and excellent processability and other physical properties proper to IR can be obtained. The MAn-IR may be used singly, or may be blended with a suitable amount of ordinary IR for adjusting the MAn content before use.

The IR to be used for preparing the MAn-IR may be produced by any method. In general, IR having a cis-1,4 content of more than 80% and obtained by polymerizing isoprene using a Ziegler-type catalyst or anionic catalyst is preferred. Upon evaluation of all the physical properties of the unvulcanized composition and the vulcanized articles prepared therefrom, it is more preferable to use polyisoprene having a cis-1,4 content of above 95% prepared with a Ziegler-type catalyst.

Presently preferred and practical embodiments of the present invention are illustratively shown in the following examples, which are not intended to be limiting in any manner.

EXAMPLE 1

The IR used had a cis-1,4 content of 98% and an intrinsic viscosity $[\nu]$ to of 3.6 dl/g measured at 30°C in toluene, which had been prepared by polymerizing isoprene using a Ziegler-type catalyst (i.e., triisobutyl aluminum-titanium tetrachloride).

800 g of said IR was dissolved in 20 liters of xylene and benzoyl peroxide (BPO) (0.4 millimoles per 100 g of IR) and maleic anhydride (MAn) (0.6 phr) (phr: part by weight per 100 parts by weight of the rubber) were added to the solution. The resultant solution was stirred at 100°C for 2.5 hours under a nitrogen atmosphere. The solution after the reaction was poured into a large amount of acetone to precipitate the polymer, and the precipitate was dried. The bound MAn content of the so-obtained MAn-IR was 0.15 mole per 100 recurring units of isoprene monomer in the polymer.

The MAn-IR and the control starting IR were respectively compounded by mill mixing according to the recipe of Table 3 below.

Table 3

| Rubber polymer | 100 parts |
| HAF carbon black | 45 parts |
| Zinc oxide | 5 parts |
| Stearic acid | 3 parts |
| Sulfur | 2 parts |
| Accelerator DM[1] | 1 part |
| Accelerator DT[2] | 0.3 part |
| Antioxidant NS-6 | 1 part |

Note: [1]Dibenzothiazyl disulfide
[2]Di-orthotolyguanidine

The mixing mill was set at a prescribed temperature by controlling the amount of cooling water and steam. The rubber polymer was banded on the mill roll and masticated to give a smooth surface. Then, HAF carbon black and stearic acid were added to the rubber followed by the addition of zinc oxide. To the mixture, anti-oxidant NS-6 [2,2'-methylene bis(4-methyl-6-tertbutylphenol)] and sulfur were added, and finally vulcanization accelerator DT and DM were added. The mixing operation was continued for an additional 5 to 10 minutes. After finishing the mixing, the rubber temperature was measured by inserting a thermocouple into the block rubber composition. The resultant unvulcanized rubber composition was sheeted (to a thickness of about 2 mm) by rolls, and the green strength was measured on the sheet. The results are shown in Table 4. A distinct improvement of the green strength can be observed when the mixing is carried out such that the rubber temperature exceeds 80°C.

Table 4

| Rubber | Temperature of the unvulcanized composition just after the mixing (°C) | Green strength (kg/cm²) | |
|---|---|---|---|
| | | Yield stress | Stress at 400% elongation |
| MAn-IR | 60 | 1.1 | 0.7 |
| | 70 | 1.6 | 1.8 |
| | 80 | 1.8 | 2.8 |
| | 90 | 2.0 | 3.5 |
| | 100 | 2.0 | 3.4 |
| IR | 60 | 0.8 | 0.3 |
| | 90 | 0.9 | 0.3 |

Note: Measured by the Instron tester at 25°C in a cross head speed of 2 cm/minute.

The composition obtained by mixing at a rubber temperature of 90°C was vulcanized in a mold at 145°C for 18 minutes. The vulcanizate obtained from this MAn-IR showed improved physical properties in comparison with a vulcanizate obtained from the starting IR as shown in Table 5.

Table 5

| | IR | MAn-IR |
|---|---|---|
| Stress at 300% elongation (kg/cm²) | 130 | 159 |
| Tensile strength (kg/cm²) | 296 | 309 |
| Elongation (%) | 610 | 520 |
| Hardness (Shore A) | 64 | 65 |
| Tear resistance (kg/cm) | 73 | 82 |

Note: Measured according to the JIS K6301.

EXAMPLE 2

MAn-IR was prepared in the same manner as in Example 1 except that n-heptane was used as a solvent, the amount of BPO was 0.37 millimole per 100 g of IR and the amount of maleic anhydride was 0.4 phr. The bound MAn content of the obtained MAn-IR was 0.08 mole per 100 units of isoprene monomer.

The above MAn-IR was subjected to mill mastication to adjust the Moony viscosity to 70. Next, mixing was carried out employing a Brabender Plastograph equipped with a mixer. When the rubber temperature was required to be lowered, cooling water was flowed through the jacket of the mixer part. When the rubber temperature was required to be elevated, a hot medium was flowed therethrough. The rubber temperature during the mixing was measured by recording the signal coming from a thermocouple which was in contact with the rubber during mixing. Incorporation of the compounding ingredients was carried out according to Table 3 above. To the masticated rubber in the mixer, there were incorporated, by mixing, HAF carbon black, stearic acid, zinc oxide, antioxidant NS-6, sulfur and vulcanization accelerators in that order to provide an unvulcanized composition. The speed of revolution of this mixer was 70 r.p.m.

As for the mixing at a rubber temperature of 150–153°C, the accelerators were not added at that temperature but instead were added after cooling the rubber below 100°C in order to avoid scorch during the mixing.

The composition obtained by mixing with the use of the Brabender Plastograph was sheeted by small rolls at a rubber temperature of above 60°C to measure the green strength. The results are shown in Table 6.

Table 6

| Rubber temperature (°C) | Green strength (kg/cm²) | |
|---|---|---|
| | Yield stress | Stress at 400% elongation |
| 60–63 | 1.1 | 0.4 |
| 70–72 | 1.5 | 1.7 |
| 98–101 | 1.7 | 2.2 |
| 150–153 | 1.6 | 2.0 |

EXAMPLE 3

MAn-IR was prepared in the same manner as in Example 1 except that the amount of BPO was 0.25 millimole per 100 g of IR and the amount of maleic anhydride was 0.3 phr. The obtained MAn-IR had the bound MAn content of 0.052 mole per 100 recurring units of isoprene monomer.

The said MAn-IR and the starting IR were respectively compounded by the B-type Banbury mixer according to the recipe shown in Table 7.

Table 7

| | | |
|---|---|---|
| Rubber polymer | 100 | parts |
| HAF carbon black | 50 | parts |
| Zinc oxide | 5 | parts |
| Stearic acid | 3 | parts |
| Sulfur | 2 | parts |
| Antioxidant NS-6 | 1 | part |

The rubber temperature was measured by inserting a thermocouple into the composition just after mixing in the Banbury mixer. The temperature of MAn-IR composition was 142°C, and that of the control IR composition was 147°C. After the Banbury mixing, accelerator MSA (N-oxydiethylene-2-benzothiazole sulfenamide) (1 part) was compounded therein by a roll mill at a rubber temperature of below 70°C and the resulting composition was sheeted to about 2 mm thickness. Separately, MAn-IR was mixed with the compounding ingredients according to the prescription shown in Table 7 above using a roll mill as in Example 1 at a rubber temperature of 66°C. Table 8 shows the results of green strength measurements on each composition.

Table 8

| Rubber | Rubber temperature (°C) | Green strength (kg/cm²) | |
|---|---|---|---|
| | | Yield stress | Stress at 400% elongation |
| Banbury mixing MAn-IR | 142 | 1.6 | 2.2 |
| Banbury mixing IR | 147 | 1.2 | 0.6 |
| Mill mixing MAn-IR | 66 | 1.3 | 0.8 |

As can be seen from Table 8, the MAn-IR mixed at the higher temperature using the Banbury mixing technique showed a higher improvement in green strength.

EXAMPLE 4

MAn-IR used in Example 1 was dissolved in benzene at a concentration of 5%. To this solution, 10% by volume of methanol, based on the volume of benzene, was added. The resultant mixture was refluxed in a nitrogen atmosphere for 3 hours to half-esterify the bound maleic anhydride. The reaction mixture was poured into a large quantity of methanol to precipitate the polymer, which was dried to give MAn-IR.

To so-obtained MAn-IR was mixed with the compounding ingredients in the same manner as in Example 1 at different temperatures. The green strength of the obtained compositions were measured. The results are shown in Table 9. The green strength was markedly increased by the mixing at a rubber temperature of above 80°C and was saturated at 90°C.

Table 9

| Rubber temperature (°C) | Green strength (kg/cm$^2$) | |
|---|---|---|
| | Yield stress | Stress at 400% elongation |
| 63 | 1.0 | 0.8 |
| 70 | 1.5 | 2.0 |
| 82 | 1.7 | 2.7 |
| 90 | 2.1 | 3.3 |
| 102 | 2.0 | 3.4 |
| 135 | 2.1 | 3.4 |

While the invention has been described with reference to preferred embodiments thereof, those skilled in the art will realize that various changes, modifications and substitutions may be made therein without departing from the spirit and scope of the invention. It is the intention, therefore, that the invention be limited only by the appended claims.

We claim:

1. A process for producing an unvulcanized rubber composition of high green strength useful in the preparation of vulcanized articles from a maleinized synthetic cis-1,4-polyisoprene rubber, which comprises mixing the maleinized synthetic cis-1,4-polyisoprene having a bound maleic anhydride content of 0.03 to 2.5 moles per 100 recurring units of isoprene monomer in the polymer with rubber compounding ingredients containing sulfur as a vulcanizing agent and a metal compound selected from the group consisting of oxide, hydroxide, carbonate, stearate, oleate, acetate and oxalate of a metal belonging to Groups II or IV of the Periodic Table in an amount of 0.1 to 15 parts by weight per 100 parts by weight of the rubber, the mixing operation of said rubber and said metal compound being carried out at a temperature of above 80°C., whereby maximum green strength of the resulting unvulcanized composition is attained.

2. The process of claim 1, wherein the mixing is carried out at a temperature of at least 90°C.

3. The process of claim 1, wherein the compound of a metal belonging to Groups II or IV of the Periodic Table is an oxide.

4. The process of claim 3, wherein the oxide is zinc oxide.

5. The process of claim 4 wherein a mixture of zinc oxide and stearic acid is employed as said compound.

6. The process of claim 1 wherein said cis-1,4-polyisoprene rubber has a cis-1,4 content of at least 80%.

7. The process of claim 1 wherein said cis-1,4-polyisoprene rubber has a cis-1,4 content of at least 95% and is obtained by polymerizing isoprene using a Ziegler-type catalyst.

8. The process of claim 1 wherein, in addition to said compound, said rubber compounding ingredients include a member selected from the group consisting of vulcanizing accelerators, fillers, antioxidants, extenders and mixtures thereof.

9. The process of claim 1, wherein the maleinized synthetic cis-1,4-polyisoprene has a bound maleic anhydride content of 0.03 to 0.06 moles per 100 recurring units of isoprene monomer in the polymer.

* * * * *